US011330607B2

(12) United States Patent
Yoon et al.

(10) Patent No.: US 11,330,607 B2
(45) Date of Patent: May 10, 2022

(54) METHOD AND APPARATUS FOR TRANSMITTING SCHEDULING REQUEST IN MOBILE COMMUNICATION SYSTEM

(71) Applicant: SAMSUNG ELECTRONICS CO., LTD., Suwon-si (KR)

(72) Inventors: Suha Yoon, Suwon-si (KR); Suyoung Park, Suwon-si (KR); Euichang Jung, Suwon-si (KR); Sunghyuk Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/041,136

(22) PCT Filed: Mar. 26, 2019

(86) PCT No.: PCT/KR2019/003481
§ 371 (c)(1),
(2) Date: Sep. 24, 2020

(87) PCT Pub. No.: WO2019/190154
PCT Pub. Date: Oct. 3, 2019

(65) Prior Publication Data
US 2021/0100010 A1    Apr. 1, 2021

(30) Foreign Application Priority Data

Mar. 28, 2018 (KR) .................. 10-2018-0036086

(51) Int. Cl.
*H04W 16/14* (2009.01)
*H04W 72/12* (2009.01)

(52) U.S. Cl.
CPC ... *H04W 72/1205* (2013.01); *H04W 72/1284* (2013.01)

(58) Field of Classification Search
CPC .............. H04W 72/1205; H04W 72/1284
(Continued)

(56) References Cited

U.S. PATENT DOCUMENTS

2016/0044701 A1* 2/2016 Zhang ............... H04W 72/1252
370/329
2016/0050667 A1* 2/2016 Papasakellariou .... H04L 1/1822
370/329
(Continued)

FOREIGN PATENT DOCUMENTS

WO   2017/043074    3/2017
WO   2017/170814    10/2017
WO   2017/213751    12/2017

OTHER PUBLICATIONS

Extended Search Report dated Mar. 18, 2021 in counterpart European Patent Application No. 19776031.7.
(Continued)

*Primary Examiner* — Danh C Le
(74) *Attorney, Agent, or Firm* — Nixon & Vanderhye P.C.

(57) ABSTRACT

The present disclosure relates a communication technique that fuses a 5G communication system supporting a higher data transmission rate following a 4G system with IoT technology and a system therefor. The present disclosure can be applied to intelligent services (e.g., smart homes, smart buildings, smart cities, smart cars or connected cars, health care, digital education, retail, security and safety related services, etc.) on the basis of 5G communication technology and IoT related technology. A method for transmitting a scheduling request (SR) of a terminal according to the present invention comprises the steps of: receiving SR configuration information; performing channel sensing of an unlicensed band in case that the SR is triggered in the
(Continued)

unlicensed band; and waiting for SR transmission in case that a channel is occupied as a result of the channel sensing.

14 Claims, 13 Drawing Sheets

(58) Field of Classification Search
USPC .............................. 370/329, 310.2; 455/418
See application file for complete search history.

(56) References Cited

U.S. PATENT DOCUMENTS

| | | |
|---|---|---|
| 2016/0100407 A1 | 4/2016 | Gaal et al. |
| 2016/0295607 A1 | 10/2016 | Vajapeyam et al. |
| 2017/0215206 A1* | 7/2017 | Cheng ................... H04W 16/14 |
| 2017/0280440 A1* | 9/2017 | Oh ....................... H04W 74/006 |
| 2017/0310433 A1 | 10/2017 | Dinan |
| 2017/0374579 A1* | 12/2017 | Wang ................. H04W 28/0278 |
| 2018/0007576 A1* | 1/2018 | Lee ........................ H04W 24/10 |
| 2018/0027493 A1* | 1/2018 | Li ...................... H04W 52/0216 |
| | | 370/280 |
| 2018/0070372 A1 | 3/2018 | Yi et al. |
| 2018/0242357 A1 | 8/2018 | Khirallah et al. |
| 2018/0324635 A1* | 11/2018 | Babaei ................... H04W 24/10 |
| 2018/0324844 A1* | 11/2018 | Babaei ............. H04W 72/1284 |
| 2018/0324872 A1* | 11/2018 | Babaei ................ H04W 72/042 |
| 2019/0116489 A1 | 4/2019 | Harada et al. |
| 2019/0132860 A1 | 5/2019 | Bhorkar et al. |
| 2021/0274539 A1* | 9/2021 | Babaei .................. H04W 74/08 |

OTHER PUBLICATIONS

International Search Report for PCT/KR2019/003481 dated Jul. 3, 2019, 5 pages.
Written Opinion of the ISA for PCT/KR2019/003481 dated Jul. 3, 2019, 5 pages.
Ericsson, "On Autonomous UL Transmissions for NR in Unlicensed Spectrum", R1-1802780, Feb. 17, 2018, Athens, Greece. 2 pages.

* cited by examiner

METHOD AND APPARATUS FOR TRANSMITTING SCHEDULING REQUEST IN MOBILE COMMUNICATION SYSTEM

This application is the U.S. national phase of International Application No. PCT/KR2019/003481 filed Mar. 26, 2019 which designated the U.S. and claims priority to KR Patent Application No. 10-2018-0036086 filed Mar. 28, 2018, the entire contents of each of which are hereby incorporated by reference.

TECHNICAL FIELD

The disclosure relates to a mobile communication system and, more particularly, to a method for a user equipment (UE) to transmit a scheduling request (SR) in an unlicensed spectrum and an apparatus therefor.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In a 5G communication system (new radio: NR), a scenario for enabling communication only in an unlicensed band (or an unlicensed spectrum) without the aid of a licensed band (or a licensed spectrum) is being discussed. To this end, a method for transmitting a scheduling request through a physical uplink control channel (PUCCH) in an unlicensed band is required.

DISCLOSURE OF INVENTION

Technical Problem

The disclosure has been made in view of the above-mentioned aspects, and an aspect of the disclosure is to provide a method for efficiently transmitting a scheduling request (SR) in an unlicensed band.

Solution to Problem

In view of the foregoing aspects, a control information reception method of a user equipment (UE) according to the disclosure comprises: receiving control information from a base station through a first module; identifying channel occupancy time from the control information using a licensed-assisted access (LAA) radio identifier; and transmitting the identified channel occupancy time to a second module performing communication through a frequency band the same as that for the first module.

Also, in view of the foregoing aspects, a control information transmission method of a base station according to the disclosure comprises: identifying scheduling information about each UE communicating through a first band; determining channel occupancy time for each UE based on the scheduling information; generating control information using the channel occupancy time and a licensed-assisted access (LAA) radio identifier; and transmitting the control information through a first module of the UE, wherein the channel occupancy time is transmitted to a second module performing communication through a frequency band the same as that for the first module.

Also, in view of the foregoing aspects, a UE according to the disclosure includes: a first module to perform first wireless communication; a second module to perform second wireless communication; and a controller to receive control information from a base station through the first module, to identify channel occupancy time from the control information using a licensed-assisted access (LAA) radio identifier, and to transmit the identified channel occupancy time to a second module performing communication through a frequency band the same as that for the first module.

Also, in view of the foregoing aspects, a base station according to the disclosure includes: a communication unit to perform communication with a different network entity; and a controller to identify scheduling information about each UE communicating through a first band, to determine channel occupancy time for each UE based on the scheduling information, to generate control information using the channel occupancy time and a licensed-assisted access (LAA) radio identifier, and to transmit the control information through a first module of the UE, wherein the channel occupancy time is transmitted to a second module performing communication through a frequency band the same as that for the first module.

Advantageous Effects of Invention

According to the disclosure, a UE can effectively transmit a scheduling request even in an unlicensed band.

MODE FOR THE INVENTION

Figure 1:
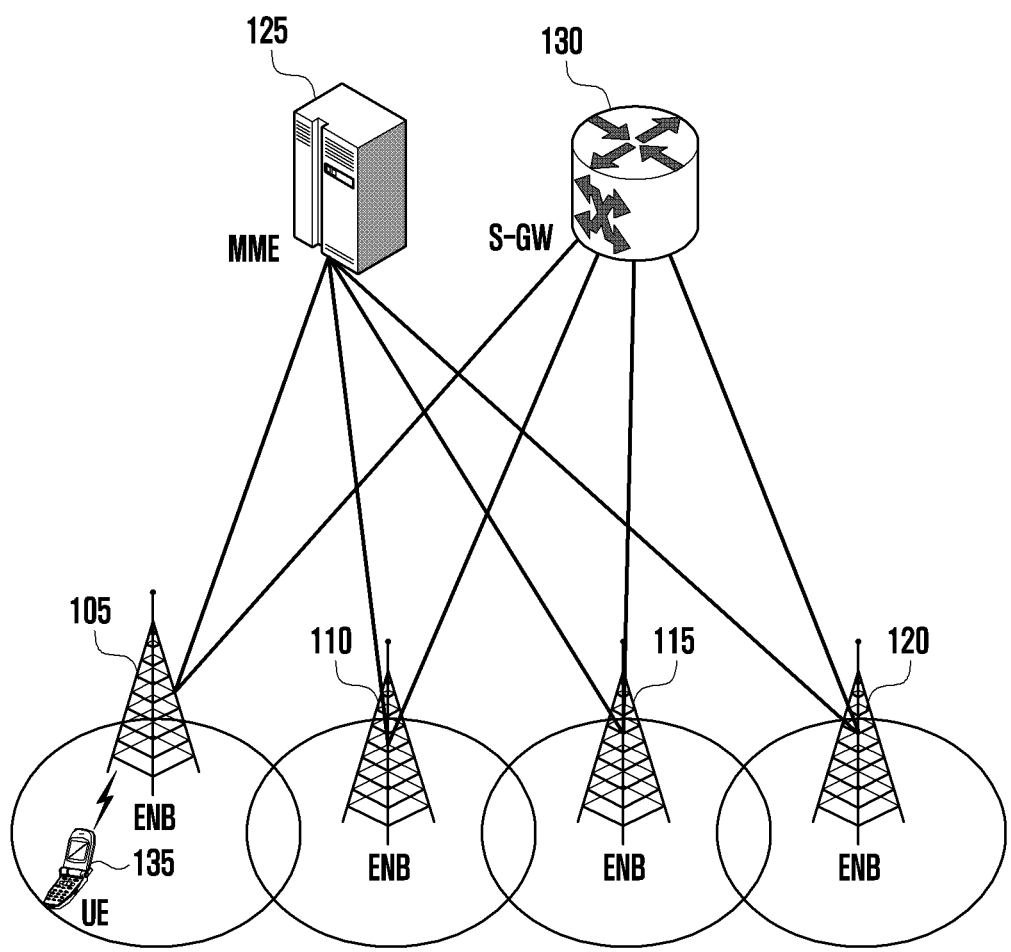
FIG. 1 illustrates the structure of an existing LTE system.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

In describing embodiments of the disclosure in the specification, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

FIG. 1 illustrates the structure of an existing LTE system.

Referring to FIG. 1, a radio access network of the LTE system includes an evolved node B (hereinafter, referred to as an ENB, a Node B, or a base station) 105, 110, 115, or 120, a mobility management entity (MME) 125, and a serving gateway (S-GW) 130. A user equipment (UE) 135 may access an external network through the ENBs 105 to 120 and the S-GW 130.

In FIG. 1, the ENBs 105 to 120 correspond to existing nodes B of a UMTS. The ENBs are connected to the UE 135 over a wireless channel and perform a more complex role than that of the existing Nodes B. In the LTE system, all user traffic including a real-time service, such as a voice over Internet protocol (VoIP) service, is provided through a shared channel, and therefore a device that collects state information, such as UEs' buffer status, available transmission power state, and channel state, and performs scheduling is required. The ENBs 105 to 120 may be responsible for these functions. One ENB generally controls a plurality of cells. For example, in order to realize a transmission speed of 100 Mbps, the LTE system uses orthogonal frequency division multiplexing (hereinafter, referred to as OFDM) as a radio access technology, for example, at a bandwidth of 20 MHz. In addition, the LTE system applies adaptive modulation & coding (hereinafter, referred to as AMC), which determines a modulation scheme and a channel coding rate according to the channel state of a UE. The S-GW 130 is a device that provides a data bearer and generates or removes a data bearer under the control of the MME 125. The MME is a device that performs not only a mobility management function for the UE but also various control functions and is connected to a plurality of base stations.

Figure 2:
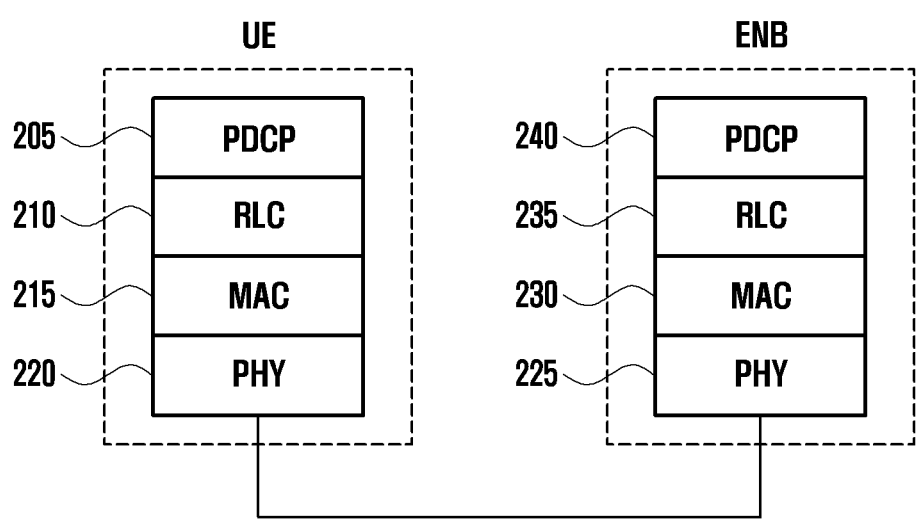
FIG. 2 illustrates the wireless protocol structure of an existing LTE system.

FIG. 2 illustrates the wireless protocol structure of an existing LTE system.

Referring to FIG. 2, a wireless protocol of the LTE system may include packet data convergence protocols (PDCPs) 205 and 240, radio link controls (RLCs) 210 and 235, and medium access controls (MACs) 215 and 230 respectively at a UE and an ENB. The packet data convergence protocols (PDCPs) 205 and 240 are responsible for IP header compression/decompression or the like, and the radio link controls (RLCs) 210 and 235 may reconstruct a PDCP packet data unit (PDU) into a proper size. The MACs 215 and 230 are connected to a plurality of RLC-layer devices configured in one UE, multiplex RLC PDUs into a MAC PDU, and demultiplex a MAC PDU into RLC PDUs. Physical layers 220 and 225 perform channel coding and modulation of upper-layer data and convert the data into OFDM symbols to transmit the OFDM symbols via a wireless channel, or demodulate OFDM symbols received via a wireless channel and perform channel decoding of the OFDM symbols to deliver the OFDM symbols to an upper layer. The physical layers also use hybrid ARQ (HARQ) for additional error correction, in which a reception terminal transmits one bit to indicate whether a packet transmitted from a transmission terminal is received. This is referred to as HARQ ACK/NACK information. Downlink HARQ ACK/NACK information in response to uplink transmission may be transmitted through a physical channel, such as a physical hybrid-ARQ indicator channel (PHICH), and uplink HARQ ACK/NACK information in response to downlink transmission may be transmitted through a physical channel, such as a PUCCH or physical uplink shared channel (PUSCH).

LTE-based transmission in an unlicensed band means that communication in an unlicensed band is performed with the aid of a licensed spectrum. Here, transmission of control information through a PUCCH is performed in a licensed band, and thus a scheduling request (SR) is also transmitted only in the licensed band.

In 5G, however, communication is expected to be also possible only in an unlicensed band without the aid of a licensed band, in which case it is required to transmit control information through an uplink control channel in the unlicensed band. Accordingly, a scheduling request (SR) may be transmitted through the uplink control channel in the unlicensed band.

The periodicity and offset of a resource for transmission of a scheduling request (SR) in 5G may be configured through RRC. Periodicity supported per subcarrier spacing is shown in the following table.

TABLE 1

| Subcarrier spacing (kHz) | Supported periodicities [ms] |
| --- | --- |
| 15 | 2 symbols, 7 symbols, 1, 2, 5, 10, 20, 32, 40, 64, 80, 128, 160, 320, 640 |
| 30 | 2 symbols, 7 symbols, 0.5, 1, 2, 5, 10, 20, 32, 40, 64, 80, 128, 160, 320, 640 |
| 60 | 2 symbols, 7 symbols (6 symbols for ECP), 0.25, 0.5, 1, 2, 5, 10, 20,, 32, 40, 64, 80, 128, 160, 320, 640 |
| 120 | 2 symbols, 7 symbols, 0.125, 0.25, 0.5, 1, 2, 5, 10, 20, 32, 40, 64, 80, 128, 160, 320, 640 |

Figure 3:
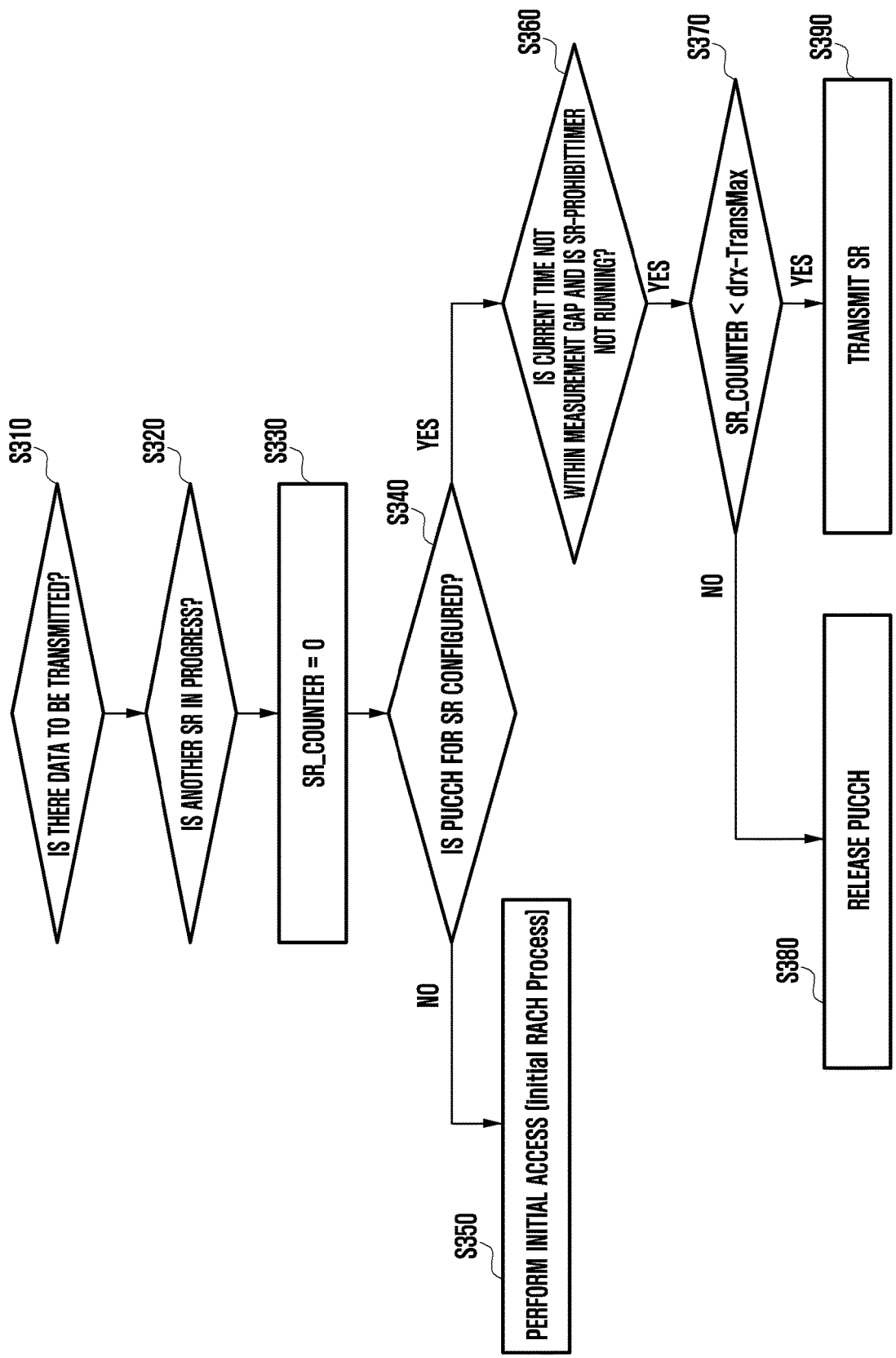
FIG. 3 is a flowchart illustrating transmission of a scheduling request (SR) according to the disclosure.

FIG. 3 is a flowchart illustrating transmission of a scheduling request (SR) according to the disclosure.

A maximum sr transmission value (hereinafter, dsr-TransMax) refers to the maximum number of scheduling request (SR) transmissions, and an sr transmission prohibition timer (hereinafter, sr-ProhibitTimer) refers to a timer for realizing a period in which transmission of a scheduling request (SR) is prevented.

When transmission of a scheduling request (SR) is indicated to a physical layer, the value of an sr counter (hereinafter, SR_COUNTER) increases by 1.

Referring to FIG. 3, a UE may identify whether there is data to be transmitted in operation S310.

When there is data to be transmitted, the UE may identify whether another scheduling request is not in progress (whether the UE has not transmitted another SR) in operation S320. When another scheduling request is not in progress (when the UE has not transmitted another SR), the SR_COUNTER value may be set to 0 (S330).

Subsequently, the UE may identify whether a PUCCH for an SR is configured in operation S340. When the PUCCH is not configured, the UE may perform an initial access process (initial RACH process) in operation S350.

When the PUCCH is configured, the UE identifies whether a current time is not within a measurement gap and whether the sr-ProhibitTimer is not driven in operation S360.

The measurement gap refers to an interval configured to measure a different frequency, and the UE cannot transmit an SR during this interval, and can also not transmit an SR even in a period in which the sr-ProhibitTimer is running.

Therefore, when the current time is within the measurement gap or the sr-ProhibitTimer is running, the UE does not transmit an SR.

However, when the current time is not within the measurement gap and the sr-ProhibitTimer is not running, the UE identifies the SR_CONTER value in operation S370.

When the SR_COUNTER value is not smaller than the dsr-TransMax value, the UE may release the PUCCH in operation S380. That is, when the SR_COUNTER value is not smaller than the dsr-TransMax value, which means that the maximum number of SR transmissions is reached, the UE cannot transmit an SR and may release the configured PUCCH.

Accordingly, the UE may notify a radio resource control (RRC) layer to release the PUCCH/SRS. Further, the UE may clear both a configured downlink allocation and an uplink (UL) grant. In addition, the UE may cancel any pending SR transmission and may perform initial access.

Some or all conditions for transmitting an SR in operation S310, operation S320, operation S330, operation S340, operation S360, and operation S370 of the disclosure may be referred to as predetermined conditions.

When the SR_COUNTER value is smaller than the dsr-TransMax value, the UE may transmit an SR in operation S390.

Specifically, the UE may indicate transmission of the SR to the physical (PHY) layer. Then, the UE may increase the SR_COUNTER value by 1. After transmitting the SR, the UE may drive the sr-ProhibitTimer so that an SR cannot be transmitted for a certain period of time.

When the UE indicates transmission of the scheduling request (SR) to the physical layer as described above, if a band in which the scheduling request (SR) is transmitted is an unlicensed band, the scheduling request (SR) may be transmitted through an uplink control channel only when the unlicensed band is not used. That is, the UE can transmit the SR only when the unlicensed band is not occupied, and when the UE indicates transmission of the SR to the physical layer but the unlicensed band is occupied, the UE cannot transmit the SR.

Accordingly, when the UE indicates SR transmission to the PHY layer but the unlicensed band is occupied, even though the scheduling request (SR) is not actually transmitted, the SR_COUNTER value may be increased, which may cause an increase in RACH overhead. Therefore, a method for solving these problems is proposed below.

Figure 4:
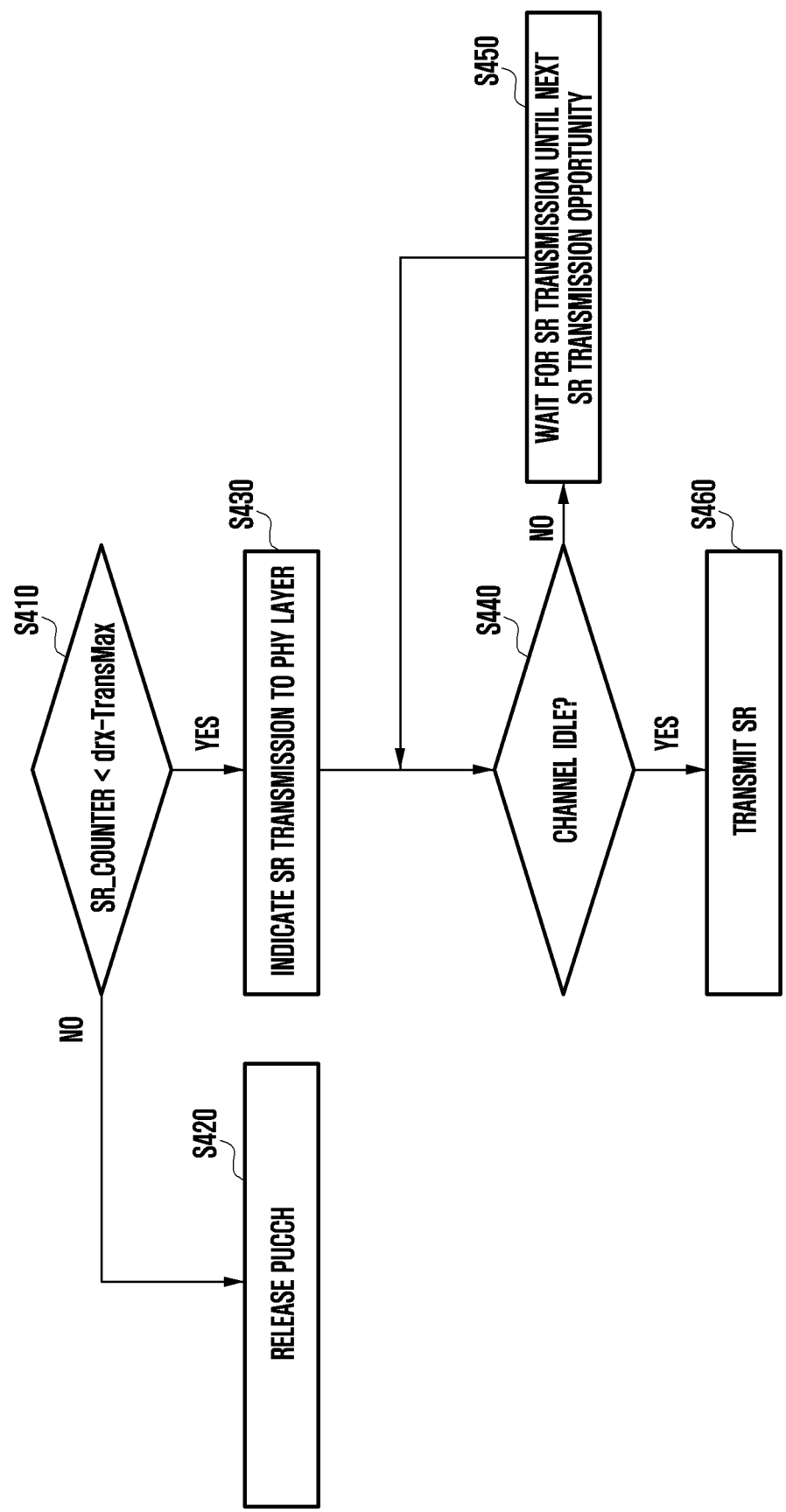
FIG. 4 illustrates a method in which a UE transmits an SR according to an embodiment of the disclosure.

FIG. 4 illustrates a method for a UE to transmit an SR according to an embodiment of the disclosure.

The UE may receive set values of dsr-TransMax and sr-ProhibitTimer described above through RRC signaling.

Referring to FIG. 4, the UE may compare an SR_COUNTER value with the dsr-TransMax value in operation S410. That is, the UE may identify whether an SR transmission condition is satisfied. As described above, SR_COUNTER refers to the number of times an SR is transmitted. Therefore, when the SR_COUNTER value is not smaller than the dsr-TransMax value, the UE may release a PUCCH in operation S420. A detailed description is similar to that of operation S380 of FIG. 3 and will be omitted below.

When the SR_COUNTER value is smaller than dsr-TransMax, an upper layer (MAC layer) of the UE may indicate SR transmission to a lower layer (PHY layer) (S430).

When SR transmission in an unlicensed band is indicated, the lower layer (PHY layer) of the UE may perform channel sensing in operation S440.

When a channel is busy (occupied) according to the result of channel sensing, the UE does not perform SR transmission but waits until a next SR transmission opportunity in operation S450. The SR transmission opportunity may be configured for the UE through RRC signaling, and an example of the periodicity of resources available for SR transmission may be as shown in Table 1.

When the channel is idle (not occupied), the UE may perform SR transmission in operation S460. In addition, the UE increases the SR_COUNTER value by 1 and starts an sr-ProhibitTimer.

In order to determine whether to increase the SR_COUNTER value according to whether the channel is occupied, the lower layer (PHY layer) may transmit a channel sensing result to the upper layer (MAC layer) after the channel sensing.

Figure 5:
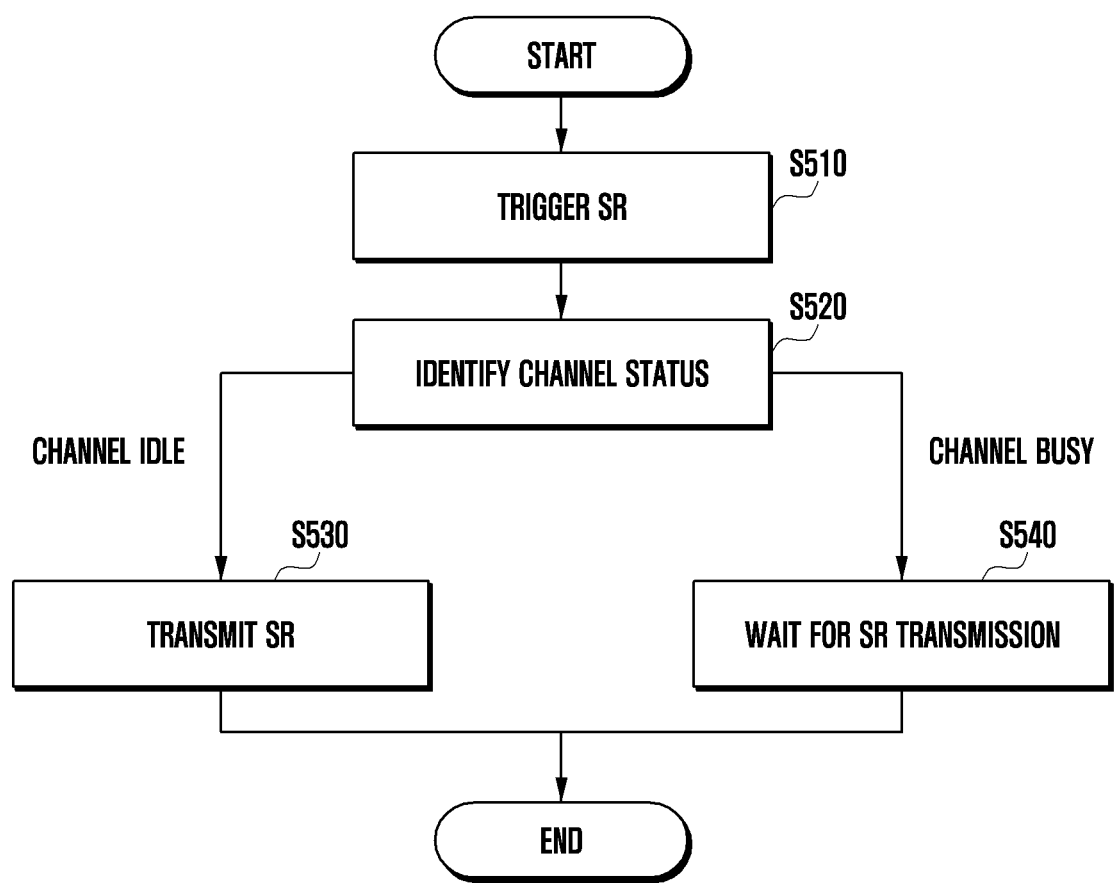
FIG. 5 illustrates the operation of a UE according to an embodiment of the disclosure.

FIG. 5 illustrates the operation of a UE according to an embodiment of the disclosure.

Referring to FIG. 5, the UE may identify whether SR transmission is triggered in operation S510. When the UE has data to transmit to a base station but does not have an allocated uplink resource, SR transmission may be triggered.

When SR transmission is triggered, the UE may identify a channel state in operation S520. That is, the UE may identify whether a channel in an unlicensed band is occupied. Specifically, when SR transmission in an unlicensed band is indicated, the UE may identify whether a channel in the unlicensed band is occupied.

When the channel is idle, the UE may transmit an SR in operation S530.

When the channel is not idle, the UE waits for SR transmission in operation S540 and may not increase an SR-related counter value.

A plurality of SRs may be configured for a 5G UE. (multiple SR configuration) Further, a plurality of SR configurations may be transmitted to the UE. Therefore, the above operation may be performed per SR configuration. That is, SR_COUNTER, sr-ProhibitTimer, and dsr-TransMax may exist for each SR configuration, and an SR transmission operation may be performed per SR configuration.

Figure 6:
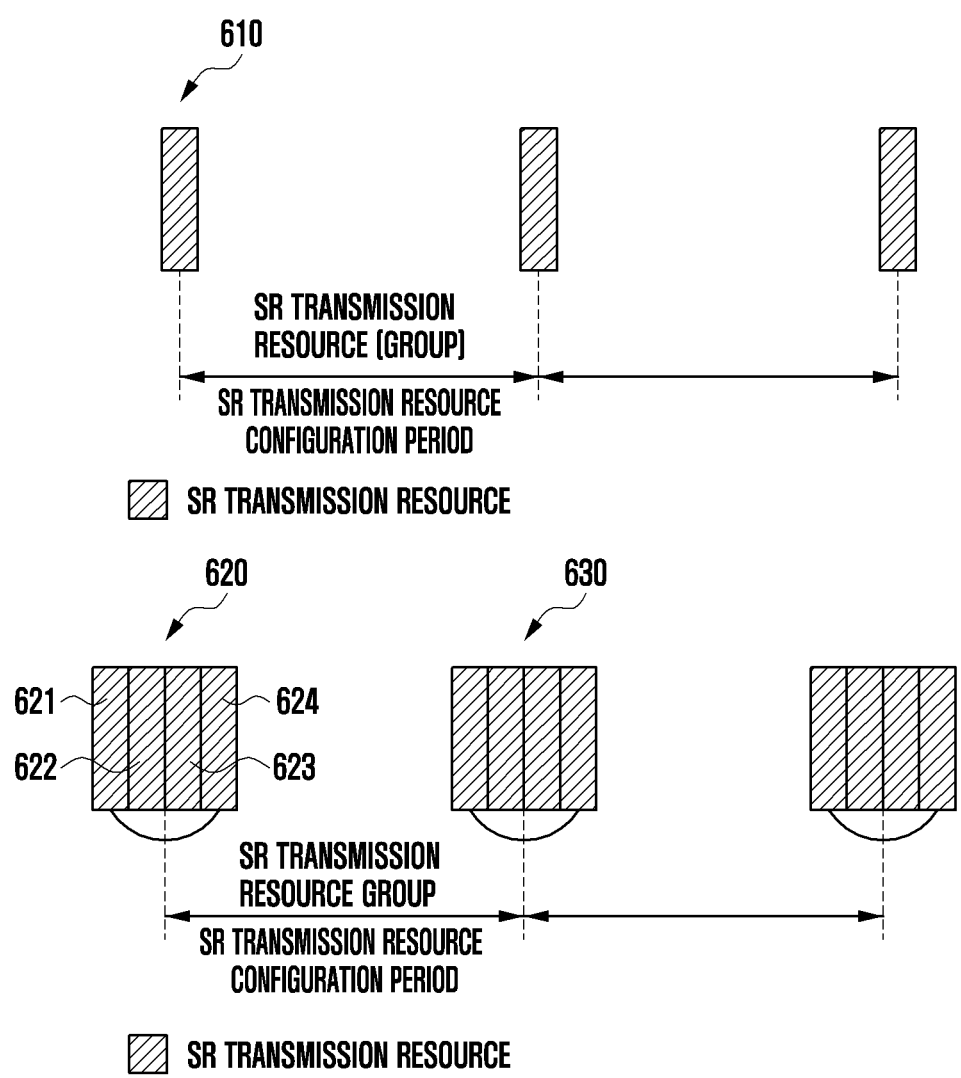
FIG. 6 illustrates an SR transmission resource according to an embodiment of the disclosure.

FIG. 6 illustrates an SR transmission resource according to an embodiment of the disclosure.

An SR transmission resource configured through one SR configuration may be as shown in FIG. 6. SR transmission is performed through an uplink control channel, and at least one uplink control channel for SR transmission may be configured for a UE through an SR configuration. In addition, through the SR configuration, at least one control channel for SR transmission may be configured to form one group, and the group may be configured to have a certain period. Therefore, pieces of configuration information about uplink control channels in the same group may include the same period. The number of SR resources included in one group may be included in SR configuration information.

However, the embodiment of the disclosure is not limited to the above example, and when a plurality of SR configurations is established, each SR configuration may include separate period information. An SR transmission resource group 610 of FIG. 6 is configured with one uplink control channel for SR transmission according to a predetermined period, and an SR transmission resource group 620 is configured with a plurality of uplink control channels for SR transmission configured according to a predetermined period.

Although not shown in FIG. 6, when a plurality of uplink control channels for SR transmission is included in one SR transmission resource group 620, the plurality of uplink control channels included in the SR transmission resource group may be nonconsecutive on a time axis.

Further, although not shown in FIG. 6, when a plurality of uplink control channels for SR transmission is included in one SR transmission resource group 620, at least some of the uplink control channels may exist on different uplink carriers. Alternatively, as shown in FIG. 6, when a plurality of uplink control channels for SR transmission is included in one SR transmission resource group, all of the uplink control channels may exist on the same uplink carrier.

The uplink control channel may be a short PUCCH or a long PUCCH. The uplink control channel may be used to transmit one piece of control information among PUCCH formats 0/1/2/3/4. The short PUCCH may include PUCCH format 0 and PUCCH format 2, and PUCCH format 0 and PUCCH format 2 may have a length of one to two symbols. The long PUCCH may include PUCCH format 1, PUCCH format 3, and PUCCH format 4, and PUCCH format 1, PUCCH format, and PUCCH format 4 may have a length of 4 to 14 symbols. In the disclosure, control information transmitted through a short PUCCH may be referred to as a short PUCCH, and control information transmitted through a long PUCCH may be referred to as a long PUCCH.

In FIG. 6, when an upper layer (MAC layer) indicates SR transmission to a lower layer (PHY layer), a UE may perform channel sensing on all SR transmission resources in one SR transmission resource group at a corresponding time. When SR transmission is successful even once as a result of channel sensing, the UE may increase an SR_COUNTER value. Details are explained with reference to FIG. 7.

Figure 7:
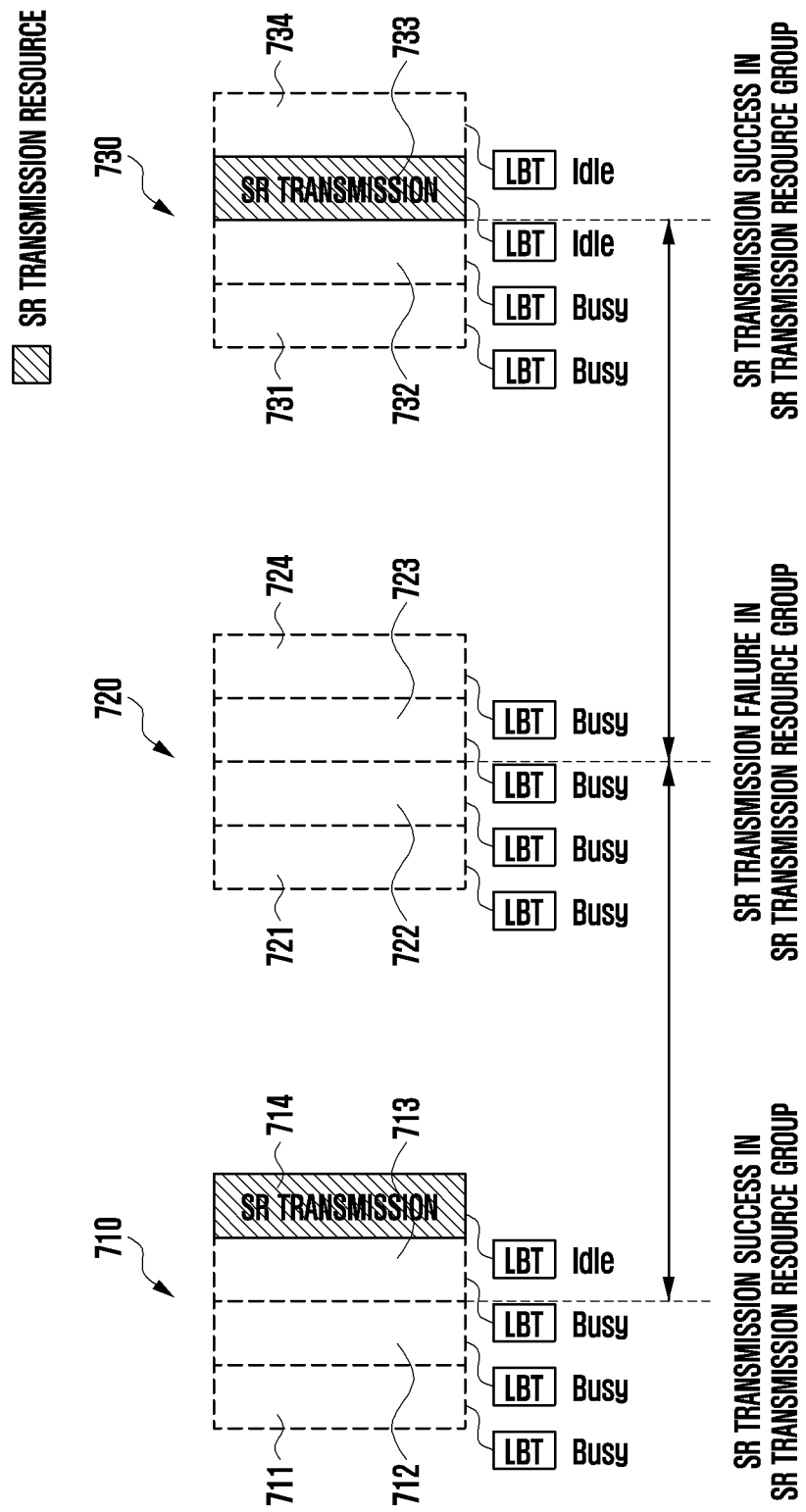
FIG. 7 illustrates an SR transmission method in an SR transmission resource group according to an embodiment of the disclosure.

FIG. 7 illustrates an SR transmission method using an SR transmission resource group according to an embodiment of the disclosure.

When a plurality of uplink control channels 711, 712, 713, and 714 is configured in one SR transmission resource group 710, a UE may sense the plurality of uplink control channels. When a channel is idle even in one resource among the plurality of uplink control channels, the UE may transmit an SR using the corresponding resource 714 and may increase an SR_COUNTER value. In addition, the UE may start an sr-ProhibitTimer.

When a plurality of uplink control channels 721, 722, 723, and 724 is configured in one SR transmission resource group 720, the UE may sense the plurality of uplink control channels. When all the uplink channels are busy, SR transmission is not performed in the corresponding resources, that is, the SR transmission resource group, and the SR_COUNTER value may be maintained. That is, when all the uplink channels are busy, the UE may hold SR transmission and may maintain the value of SR_COUNTER.

When a plurality of uplink control channels 731, 732, 733, and 734 is configured in one SR transmission resource group 730, the UE may sense the plurality of uplink control channels. When a channel is idle in a plurality of resources 733 and 734, the UE may transmit an SR using one of the resources. Here, the UE may select an SR resource for transmitting the SR. In addition, the UE may increase the SR_COUNTER value and may start the sr-ProhibitTimer.

In FIG. 7, uplink control channels in an SR transmission resource group are arranged on the time axis, and in a case of the SR transmission resource group 730, LBT is not additionally performed in the last uplink control channel 734. That is, when an uplink control channel 733 is idle, an SR may be transmitted through the uplink control channel 733, and the LBT may not be additionally performed in the last uplink control channel 734. In this manner, when the UE selects a resource for transmitting an SR in an SR transmission resource group and transmits the SR, the UE may not sense a subsequent uplink control channel, thereby reducing power consumption.

This embodiment illustrates an example in which LBT is not additionally performed in the last uplink control channel. In another example, however, when the uplink control channel 732 is idle, the UE may select the uplink control channel 732 and may transmit an SR, and may not perform LBT in two subsequent uplink control channels 733 and 734, thereby reducing power consumption of the UE.

When uplink control channels in an SR transmission resource group are configured on different uplink carriers, LBT may be performed for each carrier and the UE may select one uplink control channel among idle channels and may transmit an SR.

The disclosure illustrates an example in which the UE selects one uplink control channel to transmit an SR. However, when there is a plurality of idle channels, the UE may transmit an SR twice or more times in the SR transmission resource group.

FIG. 7 shows that uplink control channels in an SR transmission resource group are arranged on the time axis, but the disclosure is not limited thereto. The foregoing details explained with reference to FIG. 6 may also be applied.

Figure 8:
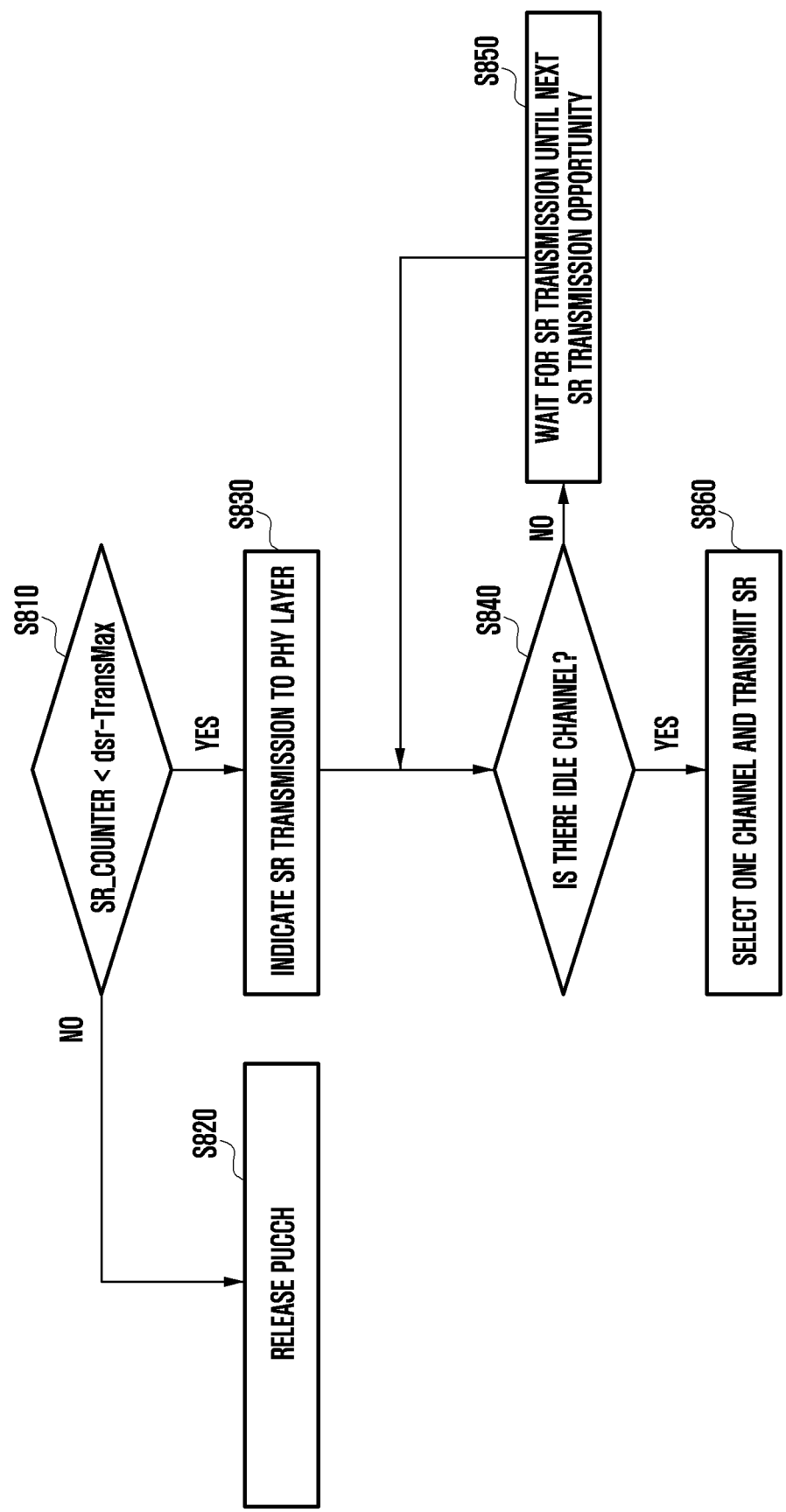
FIG. 8 is a flowchart illustrating an SR transmission method in an SR transmission resource group according to an embodiment of the disclosure.

FIG. 8 is a flowchart illustrating an SR transmission method using an SR transmission resource group according to an embodiment of the disclosure. FIG. 4 illustrates a flowchart where one SR transmission resource is configured, and FIG. 8 illustrates a flowchart where a plurality of SR transmission resources is configured.

Referring to FIG. 8, operation S810 to operation S830 are the same as operation S410 to operation S430, and thus a description thereof is omitted below.

In operation S840, a UE may perform channel sensing. When an SR is triggered in an unlicensed band, the UE performs channel sensing. When there is no idle channel as a result of channel sensing, the UE waits until a next SR transmission opportunity in operation S850. Here, the SR transmission opportunity may be configured for the UE through RRC signaling.

When there is an idle channel, the UE may select one of the idle channels and may transmit the SR in operation S860. In addition, the UE increases an SR_COUNTER value by 1 and starts an sr-ProhibitTimer.

In order to determine whether to increase the SR_COUNTER value according to whether the channel is occupied, a lower layer (PHY layer) may transmit a channel sensing result to an upper layer (MAC layer) after the channel sensing.

Figure 9:
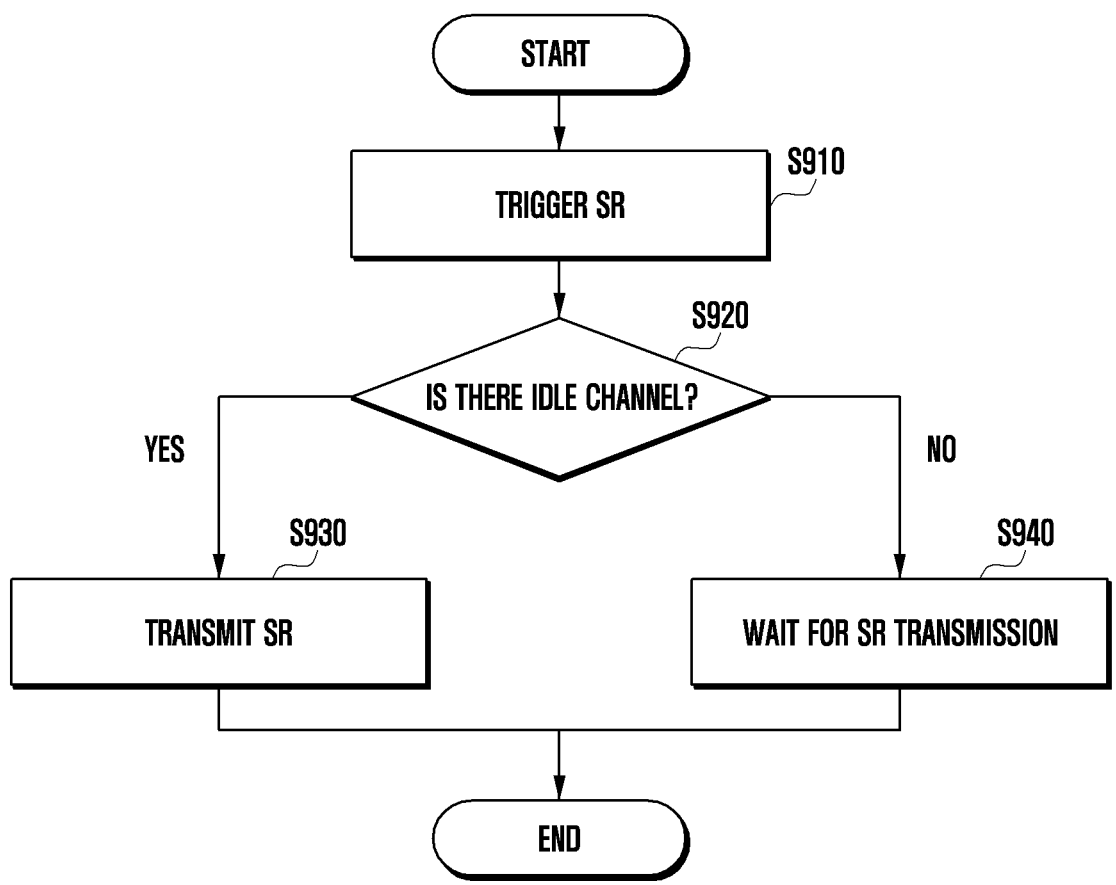
FIG. 9 illustrates the operation of a UE according to an embodiment of the disclosure.

FIG. 9 illustrates the operation of a UE according to an embodiment of the disclosure.

Referring to FIG. 9, the UE may identify whether SR transmission is triggered in operation S910. When the UE has data to transmit to a base station but does not have an allocated uplink resource, SR transmission may be triggered.

When SR transmission is triggered in an unlicensed band, the UE may identify whether there is an idle channel in operation S920.

When there is an idle channel, the UE may transmit an SR in operation S930. When there is a plurality of idle channels, the UE may select at least one of the plurality of channels and may transmit the SR.

In addition, when the UE senses resources of an SR transmission resource group including a plurality of uplink control channels (or SR transmission resources) and transmits an SR through an idle resource, the UE may stop sensing subsequent resources included in the SR transmission resource group.

When there is no idle channel, the UE may wait for SR transmission in operation S940 and may not increase an SR-related counter value.

Hereinafter, a method for setting a dsr-TransMax value in an unlicensed band to be different from that in a licensed band is proposed.

In LTE, a base station sets, for a UE, the same dsr-TransMax value for all configured serving cells.

However, the disclosure proposes a method for setting different dsr-TransmMax values for an unlicensed-band serving cell and a licensed-band serving cell.

A dsr-TransMax value set when the UE transmits an SR in an unlicensed band may be different from a dsr-TransMax value set in a licensed band. A dsr-TransMax value may be set per cell for the UE through RRC.

That is, a dsr-TransMax value included when configuring a serving cell in a 5G network may be different for each cell. Specifically, a base station may select and set an sr-TransMax value for a UE such that a dsr-TransMax value in an unlicensed band is greater than a dsr-TransMax value in a licensed band.

For example, a different dsr-TransMax value may be set for each cell by the following methods.

1) Using One Range for dsr-TransMax Value

As shown below in Table 2, the base station may configure one range for a dsr-TransMax value and may set a different value for each cell. For example, the base station may set a dsr-TransMax value for the UE using bit information. For example, the base station may set a maximum transmission value to 8 by setting a dsr-TransMax bit value of a licensed band to 1 and may set a maximum transmission value to 32 by setting a dsr-TransMax bit value of an unlicensed band to 3 and may operate. In addition, the base station may use spare fields by introducing a larger value into the spare fields.

TABLE 2

| dsr-TransMax | ENUMERATED { n4, n8, n16, n32, n64, n128, n256, spare1} |
|---|---|

2) Configuring Different sr-TransMax Ranges for a Licensed Band and a Unlicensed Band For example, as shown below in Table 3, the base station may set different dsr-TransMax values according to a licensed band/unlicensed band. For example, the base station may separately set a dsr-TransMax value for the licensed band and a dsr-TransMax value for the unlicensed band using bit information.

For example, the base station may set a dsr-TransMax value to one value (e.g. 0) through RRC signaling. Accordingly, the base station and the UE may operate understanding that the dsr-TransMax value of 0 is a maximum number of transmissions of 4 for the licensed band and a maximum number of transmissions of 16 for the unlicensed band. Further, the base station may use spare fields by introducing a larger value into the spare fields.

The base station may separately set a dsr-TransMax value for the licensed band and a dsr-TransMax value for the unlicensed band through RRC signaling. For example, the base station may set the dsr-TransMax bit value for the licensed band to 1 and the dsr-TransMax bit value for the unlicensed band to 3. In this case, the maximum number of transmissions in the licensed band may be 8, and the maximum number of transmissions in the unlicensed band may be 128.

A 5G UE may operate considering that the foregoing details are defined in a specification or there is an offset in the unlicensed band.

TABLE 3

| Licensed band | dsr_TransMax_licensed | ENUMERATED { n4, n8, n16, n32, n64, spare3, spare2, spare1} |
|---|---|---|
| Unlicensed band | dsr_TransMax_unlicensed | ENUMERATED { n16, n32, n64, n128, n256, spare3, spare2, spare1} |

Figure 10:
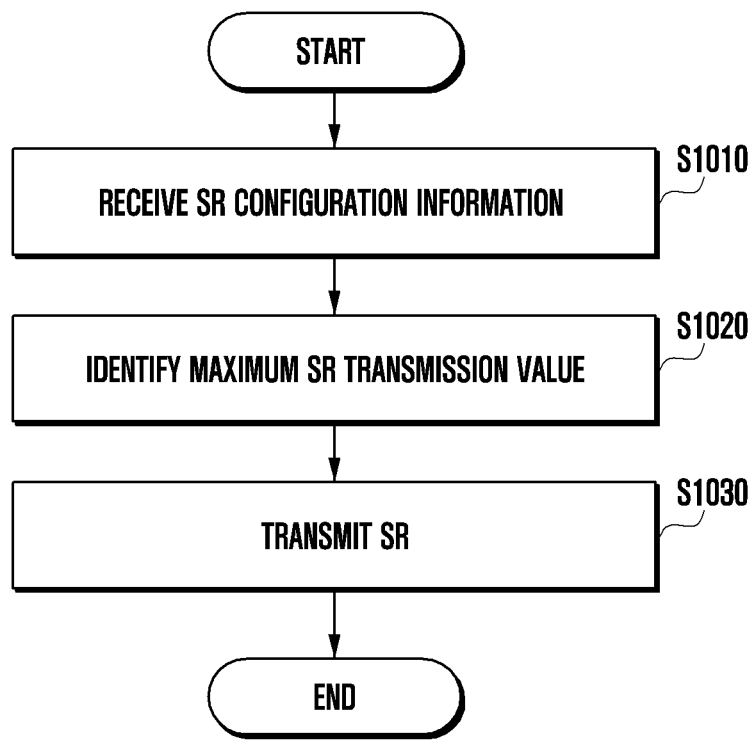
FIG. 10 illustrates the operation of a UE according to an embodiment of the disclosure.

FIG. 10 illustrates the operation of a UE according to an embodiment of the disclosure.

Referring to FIG. 10, the UE may receive SR configuration information in operation S1010. The SR configuration information may include a dsr-TransMax value. Further, the SR configuration information may include sr-ProhibitTimer and SR_COUNTER values mentioned above.

As described above, one range may be configured for a dsr-TransMax value, and the dsr-TransMax value included in the SR configuration information may include any one of values included in the range. Further, a dsr-TransMax value for a licensed band and a dsr-TransMax value for an unlicensed band may be set to different values.

Alternatively, separate ranges for a dsr-TransMax value may be configured for the licensed band and the unlicensed band. Therefore, the same bit information may indicate different dsr-TransMax values in the licensed band and the unlicensed band, respectively. Accordingly, one piece of bit information may be used to indicate the dsr-TransMax values for the licensed band and the unlicensed band, or separate pieces of bit information may be used to indicate the dsr-TransMax values for the licensed band and the unlicensed band.

In operation S1020, the UE may identify the dsr-TransMax value included in the SR configuration information. The UE may identify a dsr-TransMax value according to a used frequency band.

When an SR is triggered, the UE may transmit the SR, based on the maximum SR transmission value in operation S1030.

Figure 11:
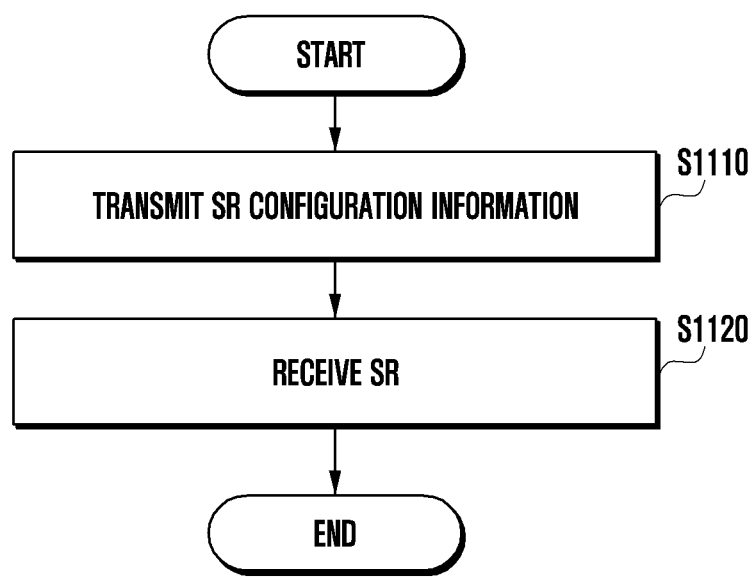
FIG. 11 illustrates the operation of a base station according to an embodiment of the disclosure.

FIG. 11 illustrates the operation of a base station according to an embodiment of the disclosure.

Referring to FIG. 11, the base station may transmit SR configuration information in operation S1110. The SR configuration information may include a dsr-TransMax value. Further, the SR configuration information may include sr-ProhibitTimer and SR_COUNTER values mentioned above.

As described above, one range may be configured for a dsr-TransMax value, and the dsr-TransMax value included in the SR configuration information may include any one of values included in the range. Further, a dsr-TransMax value for a licensed band and a dsr-TransMax value for an unlicensed band may be set to different values.

Alternatively, separate ranges for a dsr-TransMax value may be set for the licensed band and the unlicensed band. Therefore, the same bit information may indicate different dsr-TransMax values in the licensed band and the unlicensed band, respectively. Accordingly, one piece of bit information may be used to indicate the dsr-TransMax values for the licensed and unlicensed bands, or separate pieces of bit information may be used to indicate the dsr-TransMax values for licensed and unlicensed bands.

When an SR is triggered in a UE, the base station may receive the SR based on the maximum SR transmission value in operation S1120.

The disclosure illustrates a method for transmitting an SR, the method illustrated in the disclosure may be equally used in transmission of a random access preamble through a PRACH.

Specifically, a UE may identify a time to transmit a random access preamble. The UE may identify the time to transmit the random access preamble using random access resource configuration information (e.g., in the form of a table) which is predetermined or configured by a base station. In addition, the UE may use the following two values to transmit the random access preamble.

PREAMBLE_TRANSMISSION_COUNTER
PREAMBLE_POWER_RAMPING_COUNTER

When the UE intends to transmit the random access preamble using a resource in an unlicensed band, the UE may identify whether a channel is occupied. When the UE successfully transmits the random access preamble, the UE may increase PREAMBLE_POWER_RAMPING_COUNTER by 1. When it is impossible to transmit the random access preamble as a result of identifying whether the channel is occupied (LBT result), the UE does not increase PREAMBLE_POWER_RAMPING_COUNTER as proposed in the disclosure. The UE may wait for transmission of the random access preamble until a next random access preamble transmission time. Specific details may follow the foregoing flowcharts and will be omitted below.

Figure 12:
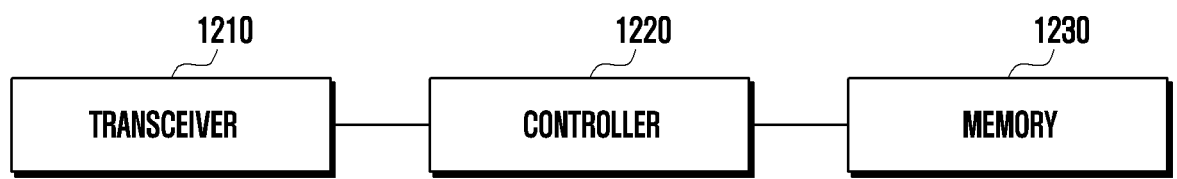
FIG. 12 illustrates the structure of a UE according to an embodiment of the disclosure.

FIG. 12 illustrates the structure of a UE according to an embodiment of the disclosure.

Referring to FIG. 12, the UE may include a transceiver 1210, a controller 1220, and a memory 1230. In the disclosure, the controller may be defined as a circuit, an application-specific integrated circuit, or at least one processor.

The transceiver 1210 may transmit and receive a signal. The transceiver 1210 may receive SR-related information, for example, from a base station.

The controller 1220 may control the overall operation of the UE according to an embodiment proposed in the disclosure. For example, the controller 1220 may control signal flow between blocks to perform an operation according to the flowcharts described above.

The memory 1230 may store at least one of information transmitted and received through the transceiver 1210 and information generated through the controller 1220.

Figure 13:
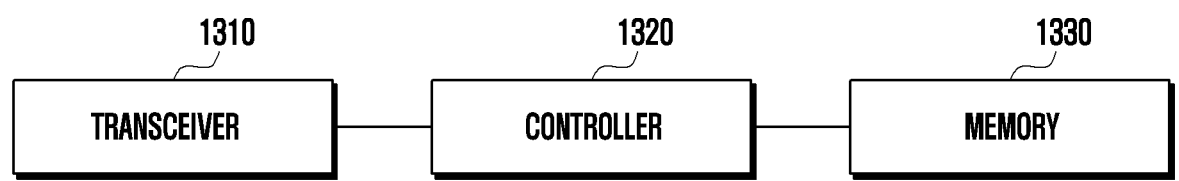
FIG. 13 illustrates the structure of a base station according to an embodiment of the disclosure.

FIG. 13 illustrates the structure of a base station according to an embodiment of the disclosure.

Referring to FIG. 13, the UE may include a transceiver 1310, a controller 1320, and a memory 1330. In the disclosure, the controller may be defined as a circuit, an application-specific integrated circuit, or at least one processor.

The transceiver 1310 may transmit and receive a signal. The transceiver 1310 may transmit SR-related information, for example, from the base station.

The controller 1320 may control the overall operation of the UE according to an embodiment proposed in the disclosure. For example, the controller 1320 may control signal flow between blocks to perform an operation according to the flowcharts described above.

The memory 1330 may store at least one of information transmitted and received through the transceiver 1310 and information generated through the controller 1320.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, although exemplary embodiments of the disclosure have been described and shown in the specification and the drawings by using particular terms, they have been used in a general sense merely to easily explain the technical contents of the disclosure and help understanding of the disclosure, and are not intended to limit the scope of the disclosure. It will be apparent to those skilled in the art that, in addition to the embodiments disclosed herein, other variants may be achieved on the basis of the technical idea of the disclosure.

The invention claimed is:

1. A method performed by a terminal in a communication system, the method comprising:
   receiving, from a base station, configuration information on one or more scheduling request (SR) configurations, wherein each of the one or more SR configurations corresponds to periodicity information depending on a subcarrier spacing for SR transmission;
   based on an SR being triggered, identifying an SR configuration corresponding to the SR among the one or more SR configurations;
   based on an SR prohibit timer configured for the SR configuration not running and a number of SR transmissions counted for the SR configuration being lower than a maximum number of SR transmissions configured for the SR configuration, identifying whether a channel where the SR is to be transmitted is occupied based on a result of channel sensing in an unlicensed band; and
   based on the channel not being occupied, transmitting the SR to the base station and increasing the number of SR transmissions counted for the SR configuration by 1,
   wherein an SR prohibit timer is configured for each of the one or more SR configurations,
   wherein a maximum number of SR transmissions is configured for each of the one or more SR configurations, and
   wherein a number of SR transmissions is counted for each of the one or more SR configurations.

2. The method of claim 1, further comprising:
   based on the channel being occupied, skipping transmitting the SR and skipping increasing the number of SR transmissions counted for the SR configuration.

3. The method of claim 1, wherein identifying whether the channel is occupied comprises:
   instructing, at an upper layer, a lower layer to transmit the SR;
   performing, at the lower layer, the channel sensing; and
   based on the channel being occupied based on the channel sensing, transmitting, at the lower layer, the result of the channel sensing to the upper layer,
   wherein the upper layer is an medium access control (MAC) layer and the lower layer is a physical layer.

4. The method of claim 3,
   wherein the result of the channel sensing includes information indicating that the channel is occupied.

5. The method of claim 3, further comprising:
   based on the channel being not occupied based on the channel sensing, increasing, at the upper layer, the number of SR transmissions counted for the SR configuration and transmitting, at the lower layer, the SR to the base station.

6. The method of claim 1,
wherein the SR configuration corresponds to a resource for transmitting the SR, and
wherein the SR is transmitted on a physical uplink control channel (PUCCH) based on the resource.

7. The method of claim 1, further comprising:
based on the number of SR transmissions counted for the SR configuration being equal to the maximum number of SR transmissions configured for the SR configuration, releasing a physical uplink control channel (PUCCH).

8. A terminal in a communication system, the terminal comprising:
a transceiver; and
a controller configured to:
receive, from a base station via the transceiver, configuration information on one or more scheduling request (SR) configurations wherein each of the one or more SR configurations corresponds to periodicity information depending on a subcarrier spacing for SR transmission,
based on an SR being triggered, identify an SR configuration corresponding to the SR among the one or more SR configurations,
based on an SR prohibit timer configured for the SR configuration not running and a number of SR transmissions counted for the SR configuration being lower than a maximum number of SR transmissions configured for the SR configuration, identify whether a channel where the SR is to be transmitted is occupied based on a result of channel sensing in an unlicensed band, and
based on that the channel being not occupied, transmit the SR to the base station via the transceiver and increase the number of SR transmissions counted for the SR configuration by 1,
wherein an SR prohibit timer is configured for each of the one or more SR configurations,
wherein a maximum number of SR transmissions is configured for each of the one or more SR configurations, and
wherein a number of SR transmissions is counted for each of the one or more SR configurations.

9. The terminal of claim 8, wherein the controller is further configured to:
based on the channel being occupied, skip transmitting the SR and skip increasing the number of SR transmissions counted for the SR configuration.

10. The terminal of claim 8, wherein the controller is configured to:
instruct, at an upper layer, a lower layer to transmit the SR,
perform, at the lower layer, the channel sensing, and
based on the channel being occupied based on the channel sensing, transmit, at the lower layer, the result of the channel sensing to the upper layer,
wherein the upper layer is an medium access control (MAC) layer and the lower layer is a physical layer.

11. The terminal of claim 10,
wherein the result of the channel sensing includes information indicating that the channel is occupied.

12. The terminal of claim 10, wherein the controller is further configured to:
based on the channel being not occupied based on the channel sensing, increase, at the upper layer, the number of SR transmissions counted for the SR configuration and transmit, at the lower layer, the SR to the base station via the transceiver.

13. The terminal of claim 8,
wherein the SR configuration corresponds to a resource for transmitting the SR, and
wherein the SR is transmitted on a physical uplink control channel (PUCCH) based on the resource.

14. The terminal of claim 8, wherein the controller is further configured to:
based on the number of SR transmissions counted for the SR configuration being equal to the maximum number of SR transmissions configured for the SR configuration, release a physical uplink control channel (PUCCH).

* * * * *